United States Patent
Fallon

[11] 3,765,524
[45] Oct. 16, 1973

[54] AUTOMATIC WORKPIECE LOADING ARRANGEMENT FOR A GRINDER FEED WHEEL

[75] Inventor: Herbert J. Fallon, Beloit, Wis.

[73] Assignee: The Bendix Corporation, Southfield, Mich.

[22] Filed: Mar. 20, 1972

[21] Appl. No.: 236,017

[52] U.S. Cl. ............... 198/59, 214/8.5 F, 221/239, 271/10, 271/131
[51] Int. Cl. ............................................ B65g 59/06
[58] Field of Search ............... 214/8.5 F; 221/176, 221/239, 267, 268; 198/24, 59; 271/10, 131, 137, 138, 144

[56] References Cited
UNITED STATES PATENTS
| | | | |
|---|---|---|---|
| 1,759,501 | 5/1930 | Frederick | 214/8.5 F |
| 1,929,340 | 10/1933 | Wagner | 214/8.5 F |
| 1,966,878 | 7/1934 | Bluzat | 214/8.5 F |

Primary Examiner—Gerald M. Forlenza
Assistant Examiner—George F. Abraham
Attorney—John R. Benefiel et al.

[57] ABSTRACT

A loader arrangement is disclosed for advancing workpieces into recesses formed in fixturing stations carried by the grinder feedwheel; and comprises a reciprocating stripper blade which forces a workpiece into the fixture recess by means of an intermediary workpiece train in turn supplied from a vertical stack of workpieces formed from a bowl feeder which are stripped off by reciprocation of the stripper blade. The workpiece immediately preceeding the one loaded in the workpiece train is located and positioned in the loader chute to maintain the position of the workpiece in the recess as the feedwheel passes through the vicinity of the loader arrangement to allow immediate retraction of the stripper blade and full seating and wiping contact with the workpiece as the fixture station passes beyond the loader chute.

11 Claims, 5 Drawing Figures

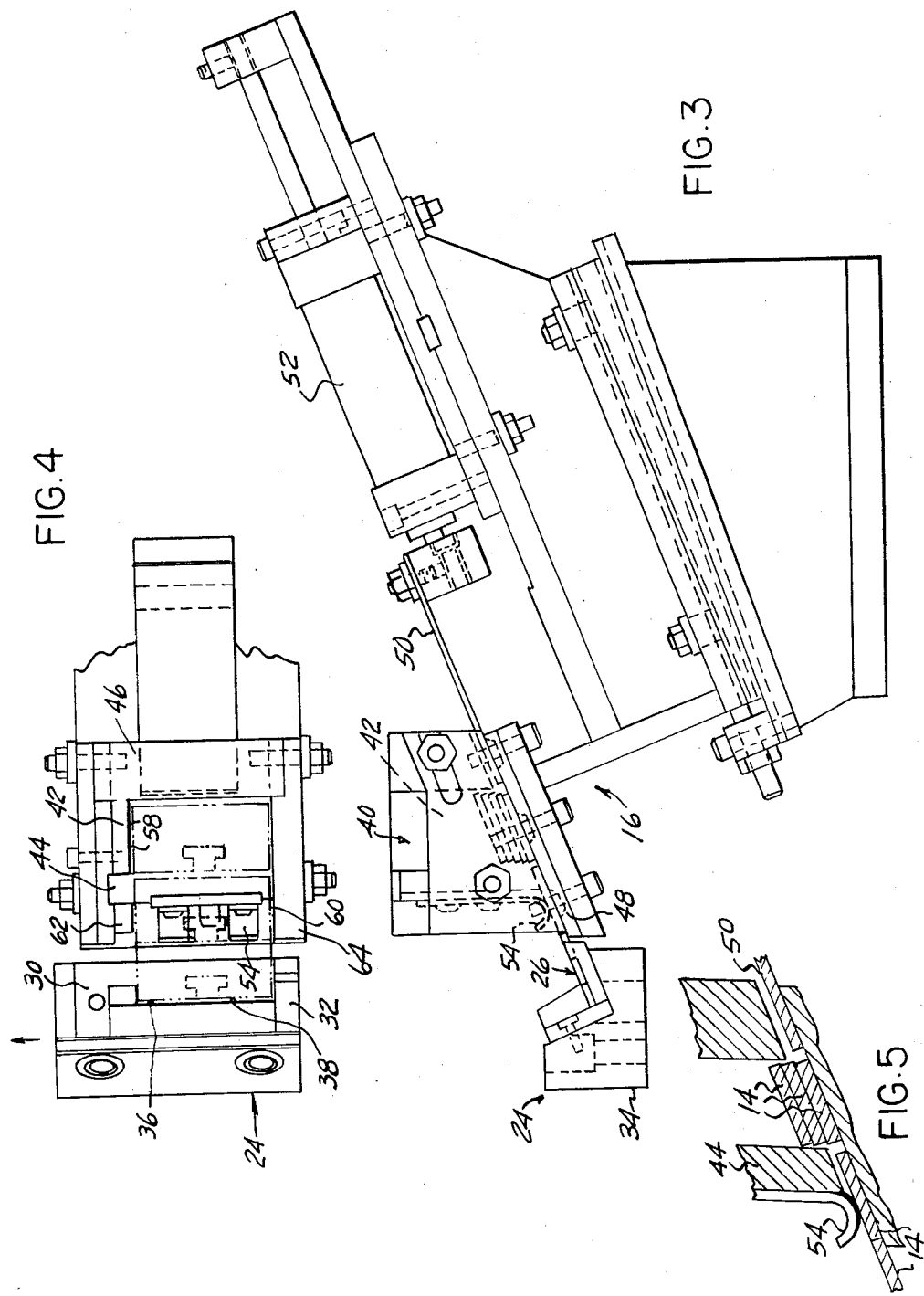

AUTOMATIC WORKPIECE LOADING ARRANGEMENT FOR A GRINDER FEED WHEEL

BACKGROUND OF THE INVENTION

1. Field of the Invention

This invention concerns loader arrangements and more particularly automatic loaders suited for high speed loading of workpieces into grinder feed mechanisms.

2. Description of the Prior Art

Automatic loader mechanisms suitable for the application described above have for the most part been limited to gravity feed arrangements in which a supply of workpieces are allowed to descend by gravity from a supply hopper and exit at the loading point in synchronism with the passing of work holding recesses on the feed mechanism. This approach is suitable for many applications but for a certain number of configurations of the feed mechanisms and workpieces, a gravity feed is precluded because the necessary accurate seating of the workpiece by gravity is not possible or else necessary loading force cannot be supplied by gravity because of the path the workpiece must follow to be seated. Additionally, certain limitations in the rate of loading or the reliability of the loading process itself produced by a gravity feed may be encountered in some situations.

Any attempt to provide positive loading of workpieces at a high rate of speed can on the other hand lead to bouncing or mispositioning of the workpiece in the recess during the loading operation, which can jam the machine or cause other difficulties. Attempts to hold the workpiece in the seated position by the positive loader could lead to limitations on the rate of load and/or scoring of the workpiece as will be described.

Therefore, it is an object of the present invention to provide an automatic workpiece loader arrangement which positively loads the workpieces at a high rate of speed with a minimum incidence of workpiece mispositioning or scoring during the loading operation.

SUMMARY OF THE INVENTION

This and other objects of the present invention are accomplished in cooperation with the fixturing stations carried by the grinder feedwheel and comprises a reciprocating stripper blade which forces a workpiece into the fixture recess by means of an intermediary workpiece train in turn supplied from a vertical stack of workpieces fed by from a bowl feeder, which are stripped off by reciprocation of the stripper blade. The workpiece immediately preceeding the one loaded in the workpiece train is located and positioned in the loader chute to maintain the position of the workpiece in the recess as the feedwheel passes through the vicinity of the loader arrangement to allow immediate retraction of the stripper blade and full seating and wiping contact with the workpiece as the fixture station passes beyond the loader chute.

DESCRIPTION OF THE DRAWINGS

FIG. 3 is an elevational enlarged view of one of the automatic loaders shown in FIG. 1 together with the fixturing associated with one of the fixture stations.

FIG. 4 is a plane view of a portion of the loader and fixturing shown in FIG. 3.

FIG. 5 is an enlarged view of the Section 5—5 taken in FIG. 4.

DETAILED DESCRIPTION

In the following detailed description certain specific terminology will be utilized for the sake of clarity and a specific embodiment will be described in order to provide a complete understanding of the invention, but it is to be understood that the invention is not so limited and may be practiced in a variety of forms and embodiments.

Figure 1:
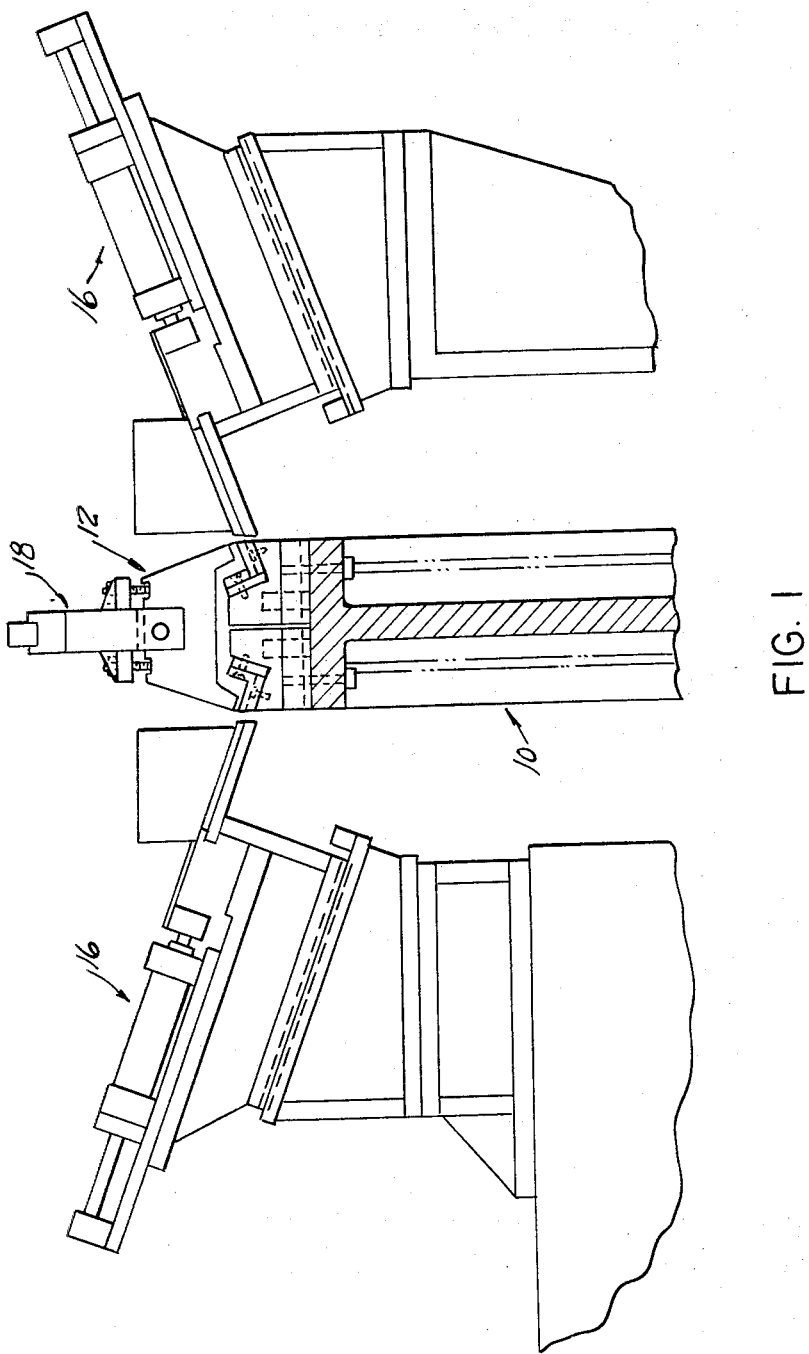
FIG. 1 is a fragmentary sectional view of a typical rotary work feedwheel and an associated fixture station showing the relationship to a pair of automatic loader arrangements according to the present invention.
Figure 2:
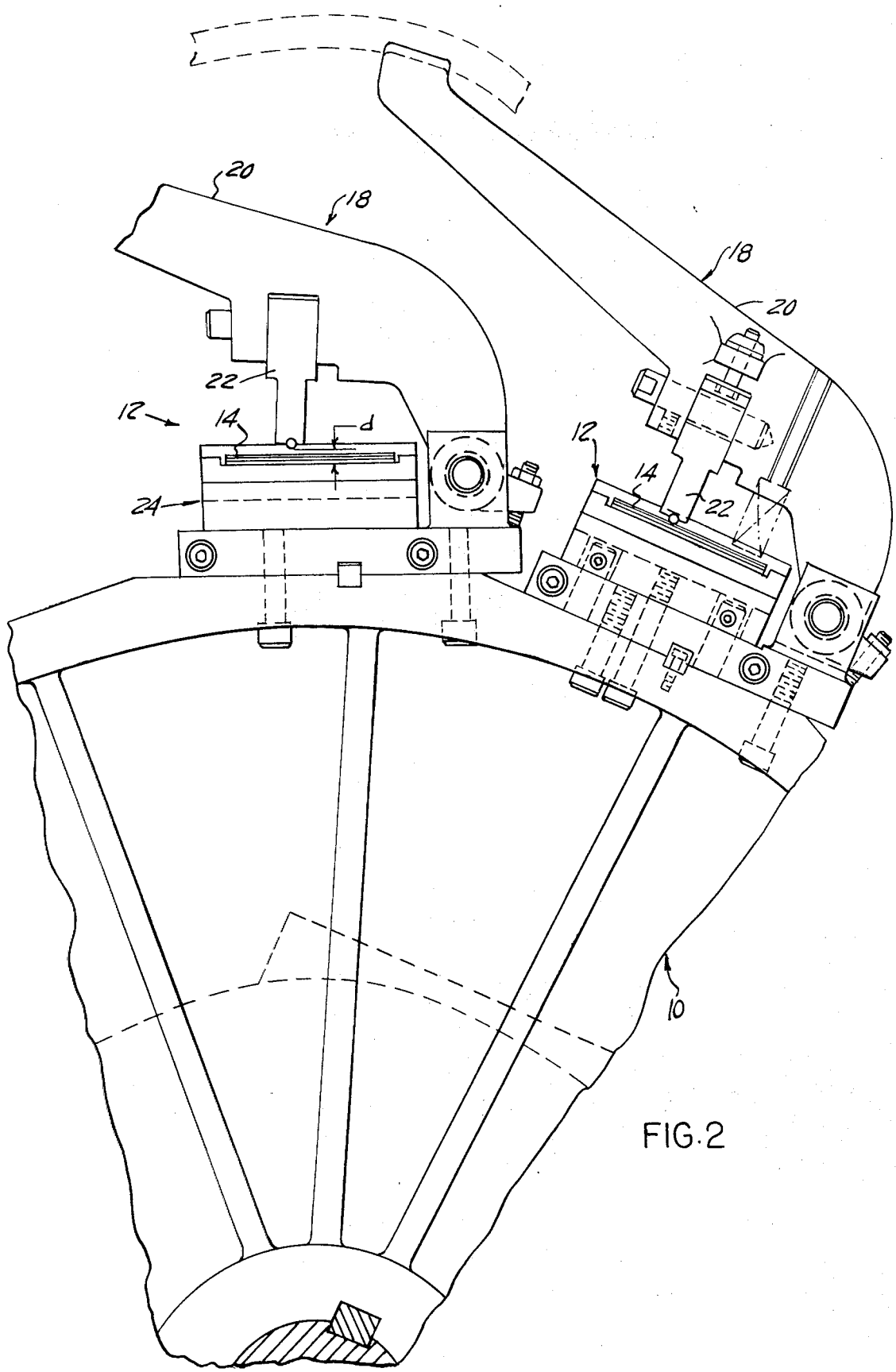
FIG. 2 is a fragmentary and enlarged side elevational view of the rotary work feedwheel shown in FIG. 1 showing a pair of fixture stations and the associated clamping mechanism.

Referring to the figures and particularly FIGS. 1 and 2, a rotary feedwheel 10 of a type well-known in the art is depicted.

The rotary feedwheel 10 is mounted for rotation and carries a series of fixturing stations 12 disposed about its periphery which are adapted to receive objects which in this context are workpieces 14, FIG. 5, from loader arrangements 16 disposed on either side of the feedwheel 10 to be subsequently carried between opposed grinding discs (not shown) by rotation of the feedwheel 10.

Each fixture station 12 includes a clamping mechanism 18, including a pivotally mounted lever arm 20 and clamping member 22 pivotally mounted thereto which engages the workpieces 14 in the clamped position. The clamping is accomplished by means of a chain (shown in phantom FIG. 2) engaging the lever arm 20 and arranged so that after each fixture station 14 passes the loading arrangement 16 the geometry of chain support (not shown) causes the chain to depress the lever arm 20 so that the workpieces are clamped before entering the grind zone.

Inasmuch as this specific type of feedwheel clamping arrangement is known in the art, and is not an essential part of the present invention, the description thereof is limited to the above, which is adequate to understand the present invention.

One of the loader arrangements 16 which is identical except for being right- and left-handed is depicted in detail in FIGS. 3 and 4, together with the recess fixture 24 associated with each fixture station 12.

Each fixture 24 provides a recess formed by a backplate 28 and two spacer sideplates 30 and 32 all fastened to a fixture block 34. The distance between spacer sideplates 30 and 32 is such that the workpiece 14 will just slide therebetween while the backplate 28 serves to properly orient the workpiece 14 when it is firmly seated thereon. In connection with this, it has been found that the workpiece 14 will seat truer on a pair of protuberances 36 and 38 on the backplate 28 rather than with an area contact which would result from direct seating on the surface thereof.

The loader arrangement 16 includes a vertical chute structure 40 which is adapted to receive workpieces 14 from a feeder source such as a bowl type hopper (not shown) and create a vertical stack of workpieces 14 within the opening 42 as shown in FIG. 3.

Plates 44 and 46 which partially define opening 42 terminate above the surface of the baseplate 48 so as to allow the bottom of the stacked workpieces 14 to be moved forwardly from the stack, down the surface of the baseplate by means of a stripper blade 50 as best seen in FIG. 5.

The stripper blade 50 is reciprocated by means of an air cylinder 52 which is controlled by suitable control circuitry and limit switches (now shown) so that as each fixture station 14 comes into registry with the loading arrangement, the stripper blade 50 is reciprocated to advance the bottommost workpiece down the baseplate 48.

The first reciprocation of the stripper blade 50 (assuming no workpieces have been loaded) causes the bottommost workpiece 14 to advance into engagement with a pair of spring retainers 54 and 56 secured to plate 44 so that the workpiece is securely held against vertical movement or against inadvertent travel up or down the baseplate 48, after which the air cylinder 52 immediately retracts the stripper blade 50 to prepare for the next cycle.

Another cycle of the stripper blade 50 advances the next workpiece from the stack down the baseplate 48 into engagement with the previously advanced workpiece which has been held in position by the spring retainers 54 and 56 which is in turn advanced by engagement with the another workpiece into the recess 26 on the fixture station 14 which is positioned in registry by suitable control circuitry and switches (not shown).

The stripper blade 50 is immediately retracted and the feedwheel 10 is advanced out of registry with loading arrangement 16. During this advance, the workpiece 14 in the recess 26 and the workpiece 14 being held by spring retainers 54 and 56 are in contact along their leading and trailing edges respectively, so that one "wipes" the other to insure that the workpiece 14 in the recess is maintained in proper position therein seated against the protuberances 36 and 38 during the period that the fixture station 12 is in approximate registry with the loading arrangement 16. In connection with this process, the workpiece 14 in position under spring retainers 54 and 56 is also guided and held in position during advancement thereof by surfaces 58 and 60 of plates 62 and 64 respectively forming guide rails along the baseplate 48. This arrangement prevents any tendency towards cocking produced by the wiping action described.

After the feedwheel 10 rotates sufficiently so that the particular fixture station 12 passed the loading arrangement 16, guide rollers or fingers (not shown) of conventional design may be used to maintain the workpiece in position until the clamping mechanisms are actuated.

The advantages of this approach to loading the workpieces 14 can be better appreciated by reference to FIG. 5 wherein it can be seen that the stripper blade 50 must be substantially thinner than the workpiece in order to insure that the stripper blade 50 engages only a single workpiece 14 in spite of variations in the thickness thereof or slight mispositioning on the baseplate 48. This difference in thickness creates a tendency for the stripper blade 50 to cause a tipping of the workpiece 14 during advance movement thereof since the respective centerlines are caused to be offset to create a turning moment. This tendency is resisted while the workpiece 14 is being stripped from the stack and advanced into engagement with spring retainers 54 and 56 by the limited overhead clearance with plate 44 and subsequently the spring retainers 54 and 56 provide a downward resilient bias force. During the movement of the lead workpiece 14 in the train into the recess 16 however, control of any tendency to tip is accomplished firstly by the workpiece-to-workpiece edge contact which eliminates the tipping tendency created by offset contact which is the case with engagement directly by the stripper blade. Secondly, any slight tendency which remains is reduced both by the limited clearance $d$ (FIG. 2) between the clamping member 22 and the recess 26 bottom and by the engagement with the workpieces 14 which is retained by the spring retainers 54 and 56. This engagement resists any upward movement, and if it does occur, the downward resilient bias exerted by spring retainers 54 and 56 snaps the workpiece downwardly back into position.

This engagement also prevents bouncing of the workpiece either as a result of seating on backplate 28 or from this tipping movement, since the intermediate workpiece 14 is firmly held against lateral movement on baseplate 48 by the spring retainers 54 and 56.

It is noted that this engagement can be maintained without delaying retraction of the stripper blade 50 which can be immediately retracted in preparation for the next cycle.

The "wiping" process noted above is also more trouble-free with a workpiece-to-workpiece engagement since contact directly with the thinner stripper blade 50, has an increased tendency to score the edge of the workpiece 14 in the recess.

From this description it can be appreciated that a simple loader arrangement has been provided which is capable of high speed positive loading of workpieces with a minimum danger of mispositioning of workpieces occurring as a result of the loading process.

It should also be apparent that many variations of the specific embodiment are possible within the scope of the following claims.

What is claimed is:

1. A system for feeding objects into a series of fixtures having recesses formed therein and moving past a loading point comprising:
    loader chute means adapted to guide said object to said loading point;
    means feeding objects into said loader chute means;
    means for cyclically advancing objects in said loader chute means so as to cause the object at said loading point to be advanced into a recess in a fixture of said fixture series aligned with said loading point by means of engagement with another object in said loader chute;
    means locating and positioning the another object in said loader chute at said loading point in engagement with said object advanced thereby into said recess as said fixture moves past said loading point, whereby said object is advanced into said recess and maintained therein by said another object at said loading point.

2. The system of claim 1 wherein said locating and positioning means includes spring retainer means engaging said object at said loading point.

3. The system of claim 2 wherein said spring retainer means frictionally engages said object as it moves to said loading point.

4. The system of claim 3 wherein said loader chute means includes guide rail means retaining said object at said loading point against movement caused by engagement with said object advanced into said recess and said movement of said fixture past said loading point.

5. The system of claim 1 wherein said recesses include surfaces positively seating said objects as said objects are advanced into said recess aligned with said loading point and seated therein by engagement with said object at said loading point.

6. The system of claim 1 wherein said means feeding objects into said loader chute means includes means forming a stacking of said objects, said stack terminating at said loader chute means and also includes stripper means stripping the lowermost object from said stack and advancing said lowermost object down said loader chute means.

7. The system of claim 6 wherein said stripper means includes a stripper blade narrower than the thickness of said objects as stacked, and means for reciprocating said stripper blade to cyclically strip off the lower-most object.

8. The system of claim 1 wherein said locating and positioning means resists movements of said object at said loading points normal to said loader chute means.

9. The system of claim 8 wherein said locating and positioning means includes spring retainer means engaging said object at said loading point.

10. The system of claim 9 wherein said spring retainer means frictionally engages said object as it moves to said loading point.

11. The system of claim 10 wherein said loader chute means includes guide rail means restraining said object at said loading point against movement caused by engagement with said object advanced into said recess and said movement of said fixture past said loading point.

* * * * *